Figure 1:
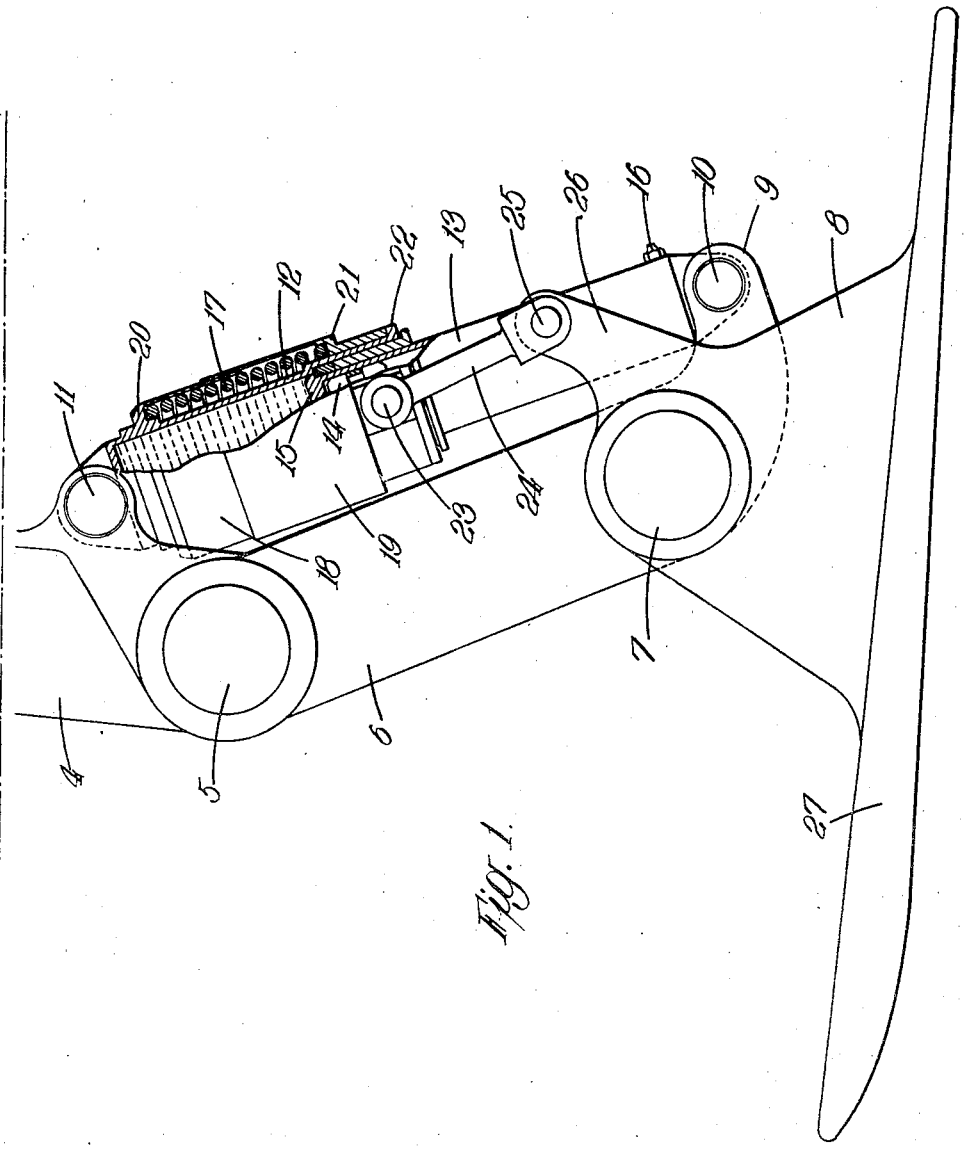

Oct. 19, 1943.  H. H. SMITH  2,332,021
SKI MOUNTING
Filed May 22, 1941  3 Sheets-Sheet 1

INVENTOR
HORACE H. SMITH,
BY Reynolds & Beach
ATTORNEYS.

Oct. 19, 1943.  H. H. SMITH  2,332,021
SKI MOUNTING
Filed May 22, 1941  3 Sheets-Sheet 2

INVENTOR
HORACE H. SMITH,
BY Reynolds & Beach
ATTORNEYS.

Oct. 19, 1943.    H. H. SMITH    2,332,021
SKI MOUNTING
Filed May 22, 1941    3 Sheets-Sheet 3

INVENTOR
HORACE H. SMITH,
BY Reynolds & Beach
ATTORNEYS

Patented Oct. 19, 1943

2,332,021

UNITED STATES PATENT OFFICE 2,332,021

SKI MOUNTING

Horace Henry Smith, Cheltenham, England, assignor to Dowty Equipment, Limited, Cheltenham, England Application May 22, 1941, Serial No. 394,703
In Great Britain June 13, 1940

5 Claims. (Cl. 244—108)

This invention relates to telescopic shock-absorbers.

Broadly stated, the invention consists in a telescopic shock-absorber embodying at least two resilient units one within another. Preferably, such a device embodies a chamber having both internally and externally of it parts which are relatively slidable against resilience operating in at least one sense; and thus it follows that in a preferred embodiment the device comprises a shock-absorber cylinder with a pin-joint at the closed end of the cylinder, whereas a plunger with a pin-joint at its outer end projects from the other end of the cylinder, there being provided externally of the same cylinder an element sliding with respect to the cylinder against resilience operating in at least one sense. Preferably, the internal shock-absorber device comprised by the plunger and chamber assembly is of the oleo-pneumatic type, whereas the external part of the shock-absorber comprised by the external sliding element preferably yields against the resilience imposed by a spring.

The composite shock-absorber constituting the present invention can be employed for affording two entirely independent resilient mountings; while in some cases, instead of being merely duplicated as to its function, it is possible that three or even more resilient connections may be embodied in the one composite shock-absorber unit.

The invention has a particular application in aircraft alighting gear where resilient means are required to mount a landing element such as a ski, pontoon, endless track or like landing element having a rigid ground- or water-contacting portion of considerable length in relation to a leg or equivalent structural part of the aircraft structure. The term "ski" will be used hereinafter, for simplicity, but it will be understood that the term is intended to include any such element of material length.

If a ski, as thus defined, is to be successfully employed in aircraft alighting gear it is believed to be necessary that the ski should, in addition to being yieldable resiliently under landing and shock-absorbing loads, also be yieldable resiliently in pitch, preferably being caused to assume a somewhat tail-down position when unloaded.

Figure 2:
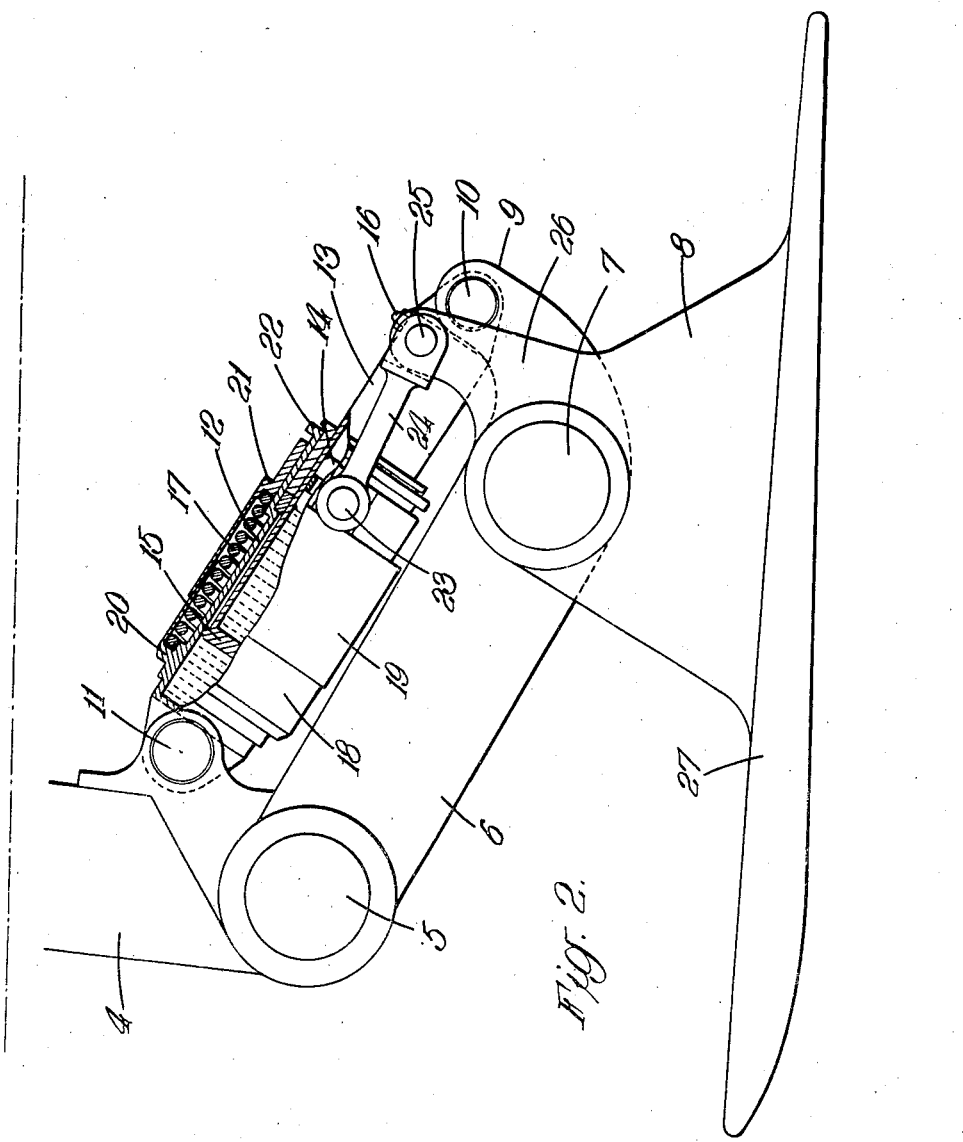
Figure 3:
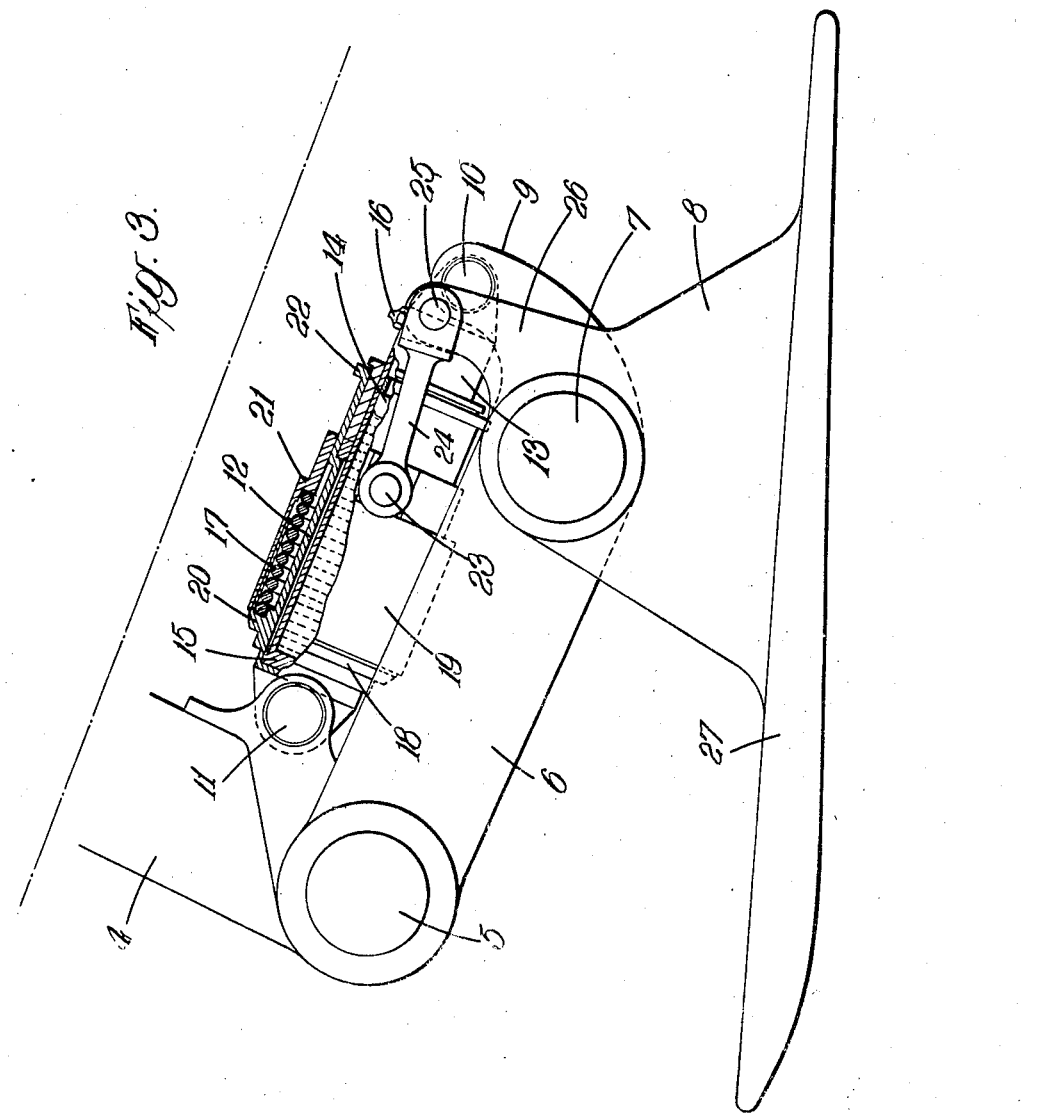

In order that it may be clearly understood and more readily carried into effect, the invention is hereinafter described with reference to the accompanying diagrammatic drawings, of which:

Figure 1 is a fragmentary side elevation of an aircraft undercarriage leg embodying a ski landing element, the mounting being shown in the position which it assumes with the leg unloaded with the aircraft in flight, and the shock-absorber being shown partly broken away;

Figure 2 corresponds to Figure 1 but shows the parts in the position which they occupy when the machine is taxiing with the tail up;

Figure 3 corresponds to Figures 1 and 2 but shows the parts in the condition which they assume when the aircraft is supported at rest with the tail down.

Referring to the drawings, the reference numeral 4 indicates the lower end of a leg which connects the resilient part of the mounting to the aircraft structure. It can be regarded that the leg is rigid, but at the same time it may be retractable. The leg part 4 carries a pivot 5 on which there is mounted the lever 6 which can swing up and down about the pivot 5 with respect to the leg 4. Remote from the pivot 5 the lever 6 carries a landing element mounting pivot 7, which in turn carries the ski pedestal 8, supporting the ski 27. At its trailing end the lever 6 is provided with the lug 9, which has a pin-joint 10, between which and an opposed pin-joint 11 on the leg 4 a shock-absorber is connected and serves to absorb landing and taxying forces.

As shown, it is the cylinder 12 of the shock-absorber which is pivotally carried by the pin-joint 11, and slidable axially of the cylinder is the hollow plunger 13. The hollow plunger 13 forms with the cylinder an oleo-pneumatic shock-absorber, and the plunger contains a piston 14. The cylinder is filled with liquid which under axial compression can pass through dynamic absorption means, of any known type, in the head 15 of the plunger 13 as the latter slides inwardly with respect to the cylinder 12, thereby forcing down the piston 14 against the resilient resistance of air introduced through the inflation valve 16 into that part of the plunger 13 behind the piston 14.

Externally of the cylinder 12 there may be provided a compression spring 17 which is enclosed by cooperating telescopic sleeve parts 18 and 19. The sleeve part 18 is fixed in relation to the cylinder, and its closed end 20 provides an abutment for one end of the spring 17. The other end of the spring 17 engages the stepped formation 21 of the moving telescopic sleeve 19 so that in an unloaded condition the moving sleeve part 19 is urged along until its outer end bears against the stop flange 22 provided externally of the cylinder 12. From a pin 23 on the sleeve part 19 there extends a connecting link 24, the other end of which is pivotally connected at 25 to the lug 26 extending up from the ski pedestal 8.

This resilient means operates independently of, though also in conjunction with the principal shock absorber. The function of the last-described resilient means is yieldingly to position the ski with its toe tilted upwardly for landing. The arrangement is such that with the mounting properly set in an unloaded condition, the ski landing element 27 is positioned with its tail slightly downwards in relation to the nose of the ski, and the attitude of the ski in pitch is resiliently controlled by the spring 17, such attitude-control or pitch stabilisation operating independently of the resilience provided by the plunger 13 in cooperation with the cylinder 12.

It will be realised that the ski pedestal 8, lugs 26, pivots 23, 25 and the connecting links 24 are duplicated to provide a pitch stabilisation control operating bilaterally of the plunger 13.

What I claim is:

1. In aircraft alighting gear a leg, a pivot on the leg and a lever mounted on and in trail of the pivot for swinging up and down thereabout, a ski pivotally mounted on said lever at a point thereof remote from the pivot on the leg, and a telescopic resilient unit operatively connected between said leg and lever to resist swinging of said lever under landing and taxiing loads, and also operatively connected between said leg and said ski resiliently to resist in at least one sense of movement changes of attitude of the ski in pitch.

2. In an aircraft alighting gear, in combination with a depending leg, a ski, and a lever pivoted by one end to the leg and pivotally supporting the ski between the ends of said lever, shock absorbing and ski positioning means interconnecting the leg, ski, and remote end of the lever, comprising a two-part shock absorber one part whereof is pivoted to the leg along an axis spaced from and parallel to the lever's pivot upon the leg, the other part being pivotally connected to the remote end of the lever, means resisting approach of said two parts, and retaining the lever, in the no-load position, in downwardly trailing position, the shock absorbing and ski positioning means further including a member slidable lengthwise the shock absorber, an arm projecting from the ski, and yieldable means interposed between said slidable member and the leg-mounted part of the shock absorber, to maintain the ski, in the no-load position, somewhat upwardly tilted.

3. In an aircraft alighting gear, in combination with a depending leg having an upper and a lower transverse pivot, a ski having corresponding upper and lower transverse pivots, a lever pivoted at one end by and trailing behind and below the lower leg pivot, and having a transverse pivot at its remote end, said lever being pivoted, intermediate its ends, to the lower pivot of the ski, a first shock absorber part pivoted by its upper end to and trailing behind and below the upper pivot of the leg, a second shock absorber part slidable relative to the first and pivoted by its lower end to the remote end of the lever, and a third part likewise slidable relative to the first part, and pivoted by its lower end to the upper pivot of the ski, and independent yieldable means interposed between the first shock absorber part and each of the second and third parts, to resist upward swinging of the lever or of the rear end of the ski.

4. In an aircraft alighting gear, in combination with a depending leg having an upper and a lower transverse pivot, a ski having corresponding upper and lower transverse pivots, at corresponding radial distances, a lever pivoted at one end by and trailing behind and below the lower leg pivot, and having a rearwardly directed remote end carrying a transverse pivot at a radial distance from its ski pivot corresponding to the spacing of the two ski pivots, a first shock absorber part pivoted by its upper end to and trailing behind and below the upper leg pivot, a second shock absorber part slidable relative to the first and pivoted by its lower end to the remote end of the lever, and a third part likewise slidable relative to the first part, and pivoted by its lower end to the upper pivot of the ski, and independent yieldable means interposed between the first shock absorber part and each of the second and third parts, to resist upward swinging of the lever or of the rear end of the ski.

5. In an aircraft alighting gear, in combination with a depending leg having an upper and a lower transverse pivot, a ski, a lever pivotally mounted to the leg's lower pivot, and pivotally mounting the ski near the lever's remote end, the ski having an arm rearwardly directed behind its pivot support upon the lever, and a three-part telescopic resilient unit operatively connected between the leg and, respectively, the lever behind the ski's pivot support, and the ski's arm, said resilient unit further including two independent resilient means to resist movement of, the one, upward movement of the ski relative to the leg, and, the other, angular movement of the ski relative to the leg.

HORACE HENRY SMITH.